United States Patent
Huh et al.

(10) Patent No.: US 9,823,511 B2
(45) Date of Patent: Nov. 21, 2017

(54) LIQUID CRYSTAL DISPLAY WHEREIN A FIRST RESISTIVITY VALUE OF A FIRST ALIGNMENT LAYER IS SMALLER THAN A SECOND RESISTIVITY VALUE OF A SECOND ALIGNMENT LAYER

(71) Applicant: Samsung Display Co., Ltd., Yongin (KR)

(72) Inventors: Soo Jeong Huh, Yongin-si (KR); Jun Ho Song, Seongnam-si (KR); Jae Hak Lee, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 213 days.

(21) Appl. No.: 14/658,502

(22) Filed: Mar. 16, 2015

(65) Prior Publication Data
US 2015/0268520 A1 Sep. 24, 2015

(30) Foreign Application Priority Data
Mar. 21, 2014 (KR) .......................... 10-2014-0033644

(51) Int. Cl.
*G02F 1/1337* (2006.01)
*G02F 1/1333* (2006.01)
*G02F 1/1343* (2006.01)

(52) U.S. Cl.
CPC ...................... *G02F 1/1337* (2013.01); *G02F 2001/133397* (2013.01); *G02F 2001/134372* (2013.01)

(58) Field of Classification Search
CPC .......................................... G02F 2001/133397
See application file for complete search history.

(56) References Cited

U.S. PATENT DOCUMENTS

| | | | |
|---|---|---|---|
| 6,384,892 B1 * | 5/2002 | Johnson | G02F 1/13306 349/123 |
| 6,509,939 B1 | 1/2003 | Lee et al. | |
| 6,549,258 B1 | 4/2003 | Shin et al. | |
| 6,721,025 B2 | 4/2004 | Woo et al. | |
| 7,068,336 B2 | 6/2006 | Oh et al. | |
| 7,145,627 B2 | 12/2006 | Lee et al. | |
| 7,295,265 B2 | 11/2007 | Oh et al. | |
| 7,465,612 B2 | 12/2008 | Chae et al. | |
| 2010/0060836 A1 * | 3/2010 | Kunimatsu | C08G 73/1078 349/123 |

(Continued)

FOREIGN PATENT DOCUMENTS

| | | |
|---|---|---|
| JP | 2001100210 | 4/2001 |
| JP | 2008233713 | 10/2008 |

(Continued)

*Primary Examiner* — Paul Lee
(74) *Attorney, Agent, or Firm* — Cantor Colburn LLP (57) ABSTRACT

A liquid crystal display includes a first substrate, a first electrode disposed on the first substrate, a second electrode which is disposed on the first substrate and overlaps the first electrode, an insulating layer interposed between the first electrode and the second electrode, a first alignment layer disposed on the first electrode and the second electrode, a second substrate facing the first substrate, and a second alignment layer disposed on the second substrate, where a first resistivity value of the first alignment layer is smaller than a second resistivity value of the second alignment layer.

7 Claims, 5 Drawing Sheets

(56) References Cited

U.S. PATENT DOCUMENTS

| | | | | |
|---|---|---|---|---|
| 2010/0066961 A1* | 3/2010 | Matsui | ............ | G02F 1/133723 349/129 |
| 2011/0051064 A1* | 3/2011 | Matsumori | ....... | G02F 1/133711 349/123 |
| 2013/0128187 A1* | 5/2013 | Matsui | .................. | G02F 1/1303 349/61 |

FOREIGN PATENT DOCUMENTS

| | | |
|---|---|---|
| JP | 2009080301 | 4/2009 |
| JP | 2010008616 | 1/2010 |
| KR | 100370927 | 1/2003 |
| KR | 100740928 | 7/2007 |
| KR | 1020110011380 | 2/2011 |
| KR | 101097647 | 12/2011 |

* cited by examiner

LIQUID CRYSTAL DISPLAY WHEREIN A FIRST RESISTIVITY VALUE OF A FIRST ALIGNMENT LAYER IS SMALLER THAN A SECOND RESISTIVITY VALUE OF A SECOND ALIGNMENT LAYER

This application claims priority to and the benefit of Korean Patent Application No. 10-2014-0033644 filed on Mar. 21, 2014, and all the benefits accruing therefrom under 35 U.S.C. §119, the entire contents of which are incorporated herein by reference.

BACKGROUND (a) Field

The invention relates to a liquid crystal display.

(b) Description of the Related Art

A liquid crystal display ("LCD") is one of the most widely used flat panel displays, and displays images by applying voltages to field-generating electrodes to generate an electric field in an LC layer that determines orientations of LC molecules therein to adjust polarization of incident light.

The LCD has a merit in that light weight and thin formation thereof are easily obtained. However the LCD has a drawback in that lateral visibility is lower than front visibility, and liquid crystal arrangements and driving methods of various types have been developed to solve the drawback. To realize a wide viewing angle, an LCD including a pixel electrode and a reference electrode on one substrate has been spotlighted.

In the LCD, at least one of two field generating electrodes among a pixel electrode and a common electrode has a plurality of cutouts defined therein, and a plurality of branch electrodes defined by the plurality of cutouts.

SUMMARY

When disposing two field generating electrodes on one substrate in a liquid crystal display ("LCD"), after applying voltage to the field generating electrode, although the applied voltage is turned off, a molecular ion is not discharged such that an unnecessary electric field is maintained, thereby generating an afterimage.

The invention provides a LCD including two field generating electrodes on one substrate thereof, and preventing an afterimage.

An LCD according to an exemplary embodiment of the invention includes a first substrate, a first electrode disposed on the first substrate, a second electrode which is disposed on the first substrate and overlaps the first electrode, an insulating layer interposed between the first electrode and the second electrode, a first alignment layer disposed on the first electrode and the second electrode, a second substrate facing the first substrate, and a second alignment layer disposed on the second substrate, where a first resistivity value of the first alignment layer is smaller than a second resistivity value of the second alignment layer.

A ratio of the second resistivity value of the second alignment layer to the first resistivity value of the first alignment layer may be about 10 to about 100.

A first thickness of the first alignment layer is larger than a second thickness of the second alignment layer.

A ratio of the second thickness of the second alignment layer to the first thickness of the first alignment layer is about 0.3 to about 0.7.

One of the first electrode and the second electrode may have a plurality of cutouts defined therein.

A color filter disposed between the second substrate and the second alignment layer may be further included.

An LCD according to another exemplary embodiment of the invention includes a first substrate, a first electrode disposed on the first substrate, a second electrode which is disposed on the first substrate and overlaps the first electrode, an insulating layer interposed between the first electrode and the second electrode, a first alignment layer disposed on the first electrode and the second electrode, a second substrate facing the first substrate, and a second alignment layer disposed on the second substrate, where a first thickness of the first alignment layer is larger than a second thickness of the second alignment layer.

According to the LCD according to an exemplary embodiment of the invention, two field generating electrodes may be disposed on one substrate, and the afterimage may be prevented.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on," "connected to" or "coupled to" another element, it can be directly on the other element or intervening elements may also be present. In contrast, when an element is referred to as being "directly on," "directly connected to" or "directly coupled to" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example In an exemplary embodiment, if when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Next, a liquid crystal display ("LCD") according to an exemplary embodiment of the invention will be described with reference to accompanying drawings.

Figure 1:
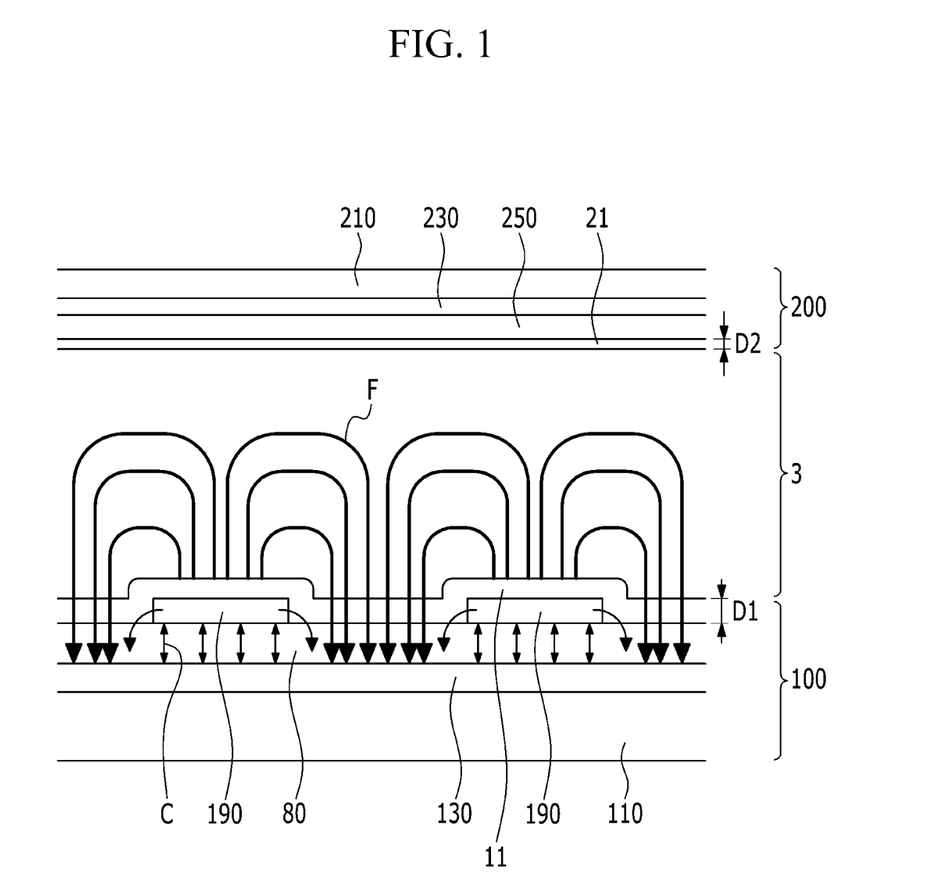
FIG. 1 is a schematic cross-sectional view of an exemplary embodiment of a liquid crystal display ("LCD") according to the invention.

First, an LCD according to an exemplary embodiment of the invention will be described with reference to FIG. 1. FIG. 1 is a schematic cross-sectional view of an LCD according to an exemplary embodiment of the invention.

Referring to FIG. 1, the LCD according to an exemplary embodiment of the invention includes a first display panel 100 and a second display panel 200 facing each other, and a liquid crystal layer 3 interposed therebetween.

The first display panel 100 includes a first electrode 130 and a second electrode 190 disposed on a first substrate 110 and overlapping each other via an insulating layer 80 interposed therebetween, and a first alignment layer 11 disposed on the first electrode 130 and the second electrode 190.

The second display panel 200 includes a color filter 230, an overcoat 250, and a second alignment layer 21 disposed on a second substrate 210.

In an exemplary embodiment, resistivity of the first alignment layer 11 is smaller than resistivity of the second alignment layer 21. In the exemplary embodiment, a ratio of the resistivity of the second alignment layer 21 to the resistivity of the first alignment layer 11 is about 10 to about 100, for example.

In an exemplary embodiment, a first thickness D1 of the first alignment layer 11 is smaller than a second thickness D2 of the second alignment layer 21. In the exemplary embodiment, a ratio (D2/D1) of the second thickness D2 of the second alignment layer 21 to the first thickness D1 of the first alignment layer 11 is about 0.3 to about 0.7.

In an exemplary embodiment, the resistivity value of the second alignment layer 21 may be larger than about 10E14, and the resistivity value of the first alignment layer 11 may be smaller than about 10E13. In an exemplary embodiment, the resistivity value of the second alignment layer 21 may be larger than about 10E16, and the resistivity value of the first alignment layer 11 may be smaller than about 10E14, for example. In an exemplary embodiment, the second alignment layer 21 may be an inorganic material.

Voltages are respectively applied to the first electrode 130 and the second electrode 190 to generate an electric field F, and liquid crystal molecules of the liquid crystal layer 3 are rotated by the electric field F.

After the voltages respectively applied to the first electrode 130 and the second electrode 190 are blocked, a charge C that is charged to the first electrode 130 and the second electrode 190 is not discharged such that the unnecessary electric field may be applied to the liquid crystal layer 3 by the charge C. The unnecessary charge may inflow from an impurity of the color filter 230 provided at the second display panel 200.

According to an exemplary embodiment of the LCD of the invention, the resistivity value of the first alignment layer 11 disposed on the first display panel 100 is substantially small and the first thickness D1 of the first alignment layer 11 is substantially large. Also, the resistivity value of the second alignment layer 21 is substantially large and the second thickness D2 of the second alignment layer 21 is substantially small. In an exemplary embodiment, the ratio of the resistivity of the second alignment layer 21 to the resistivity of the first alignment layer 11 is about 10 to about 100, and the ratio (D2/D1) of the second thickness D2 of the second alignment layer 21 to the first thickness D1 of the first alignment layer 11 is about 0.3 to about 0.7, for example.

The resistivity value of the first alignment layer 11 disposed on the first display panel 100 is substantially small and the first thickness D1 of the first alignment layer 11 is substantially large such that the charged charge C may be easily discharged. When the resistivity is substantially small, the charge may be easily moved such that the charged charge C may be easily discharged. Also, when the first thickness D1 is substantially large, the capacitance is decreased such that the charged charge C may be easily discharged.

The resistivity value of the second alignment layer 21 disposed in the second display panel 200 is substantially large and the second thickness D2 of the second alignment layer 21 is substantially small such that the impurity emitted from the color filter 230 of the second display panel 200 is difficult to exhaust outside thereof. In detail, the resistivity value of the second alignment layer 21 is substantially large such that it is difficult for the charge to be moved, and the second thickness D2 is substantially small such that the capacitance is large and it is difficult for the unnecessary charge to be moved. Accordingly, the unnecessary charge does not inflow from the impurity that may be generated from an organic layer, such as the color filter 230, provided at the second display panel 200.

As described above, for the LCD according to an exemplary embodiment of the invention, by controlling the resistivity value and the thickness of the first alignment layer 11 provided in the first display panel 100 and the second alignment layer 21 disposed in the second display panel 200, the charged charge C in the first display panel 100 including two field generating electrodes may be easily discharged, and flow of the unnecessary charge that may be generated from the impurity in the second display panel 200 may be reduced or effectively prevented. Accordingly, application of the unnecessary electric field to the liquid crystal layer by the charged charge may be reduced or effectively prevented, thereby preventing the afterimage due to the unnecessary electric field.

Figure 2:
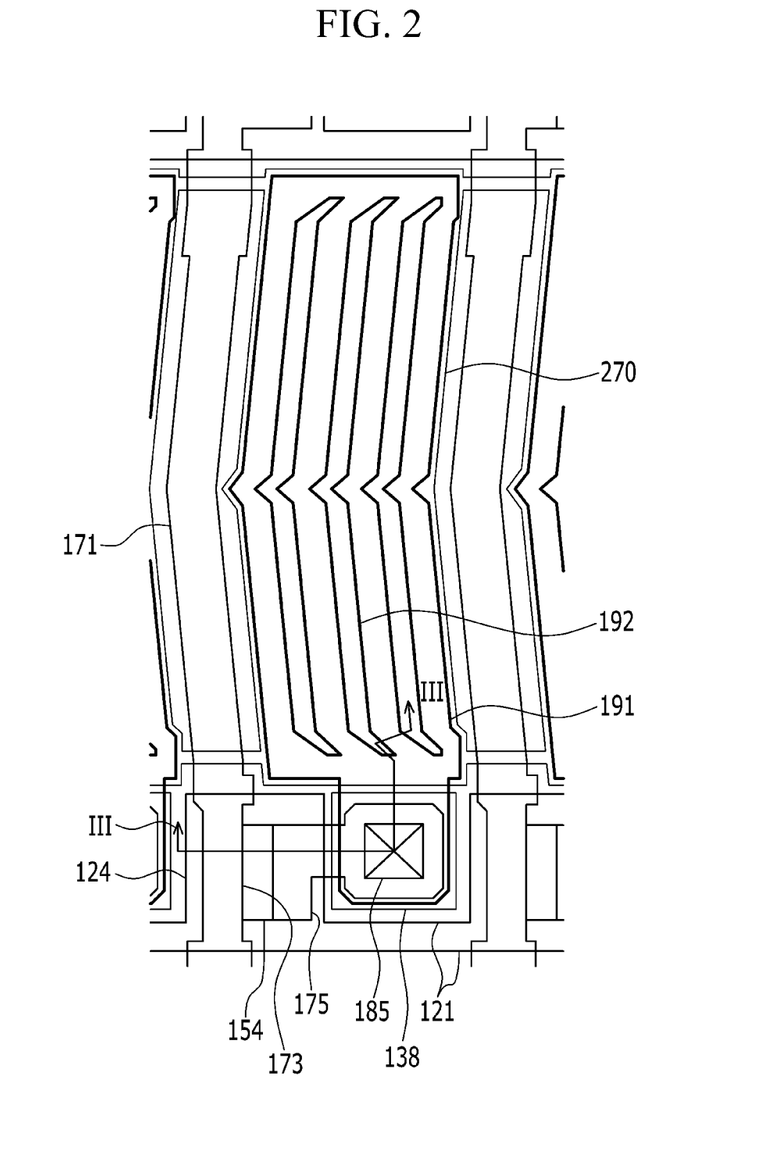
FIG. 2 is a plan view of an exemplary embodiment of an LCD according to the invention.

Next, the LCD according to an exemplary embodiment of the invention will be described with reference to FIGS. 2 and 3. FIG. 2 is a plan view of an LCD according to an exemplary embodiment of the invention, and FIG. 3 is a cross-sectional view of the LCD of FIG. 2 take along line III-III.

Figure 3:
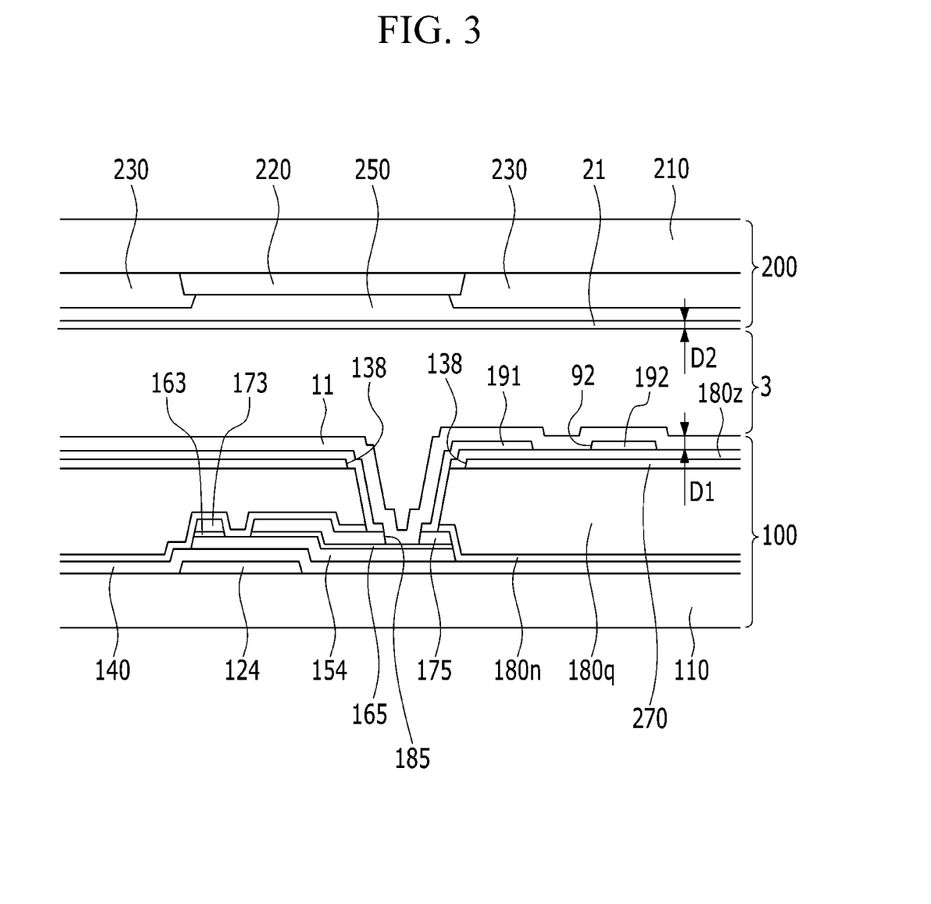
FIG. 3 is a cross-sectional view of the LCD of FIG. 2 take along line III-III.

Referring to FIGS. 2 and 3, an LCD according to an exemplary embodiment of the invention includes a first display panel 100 and a second display panel 200 opposite to each other, and a liquid crystal layer 3 injected between the display panels.

Firstly, the first display panel 100 will be described.

In an exemplary embodiment, a gate conductor including a gate line 121 is disposed on a first substrate 110 including transparent glass, plastics, or the like.

The gate line 121 includes a gate electrode 124, and a wide end portion (not shown) for connection with another layer or an external driving circuit.

In an exemplary embodiment, a gate insulating layer 140 including a silicon nitride (SiNx), a silicon oxide (SiOx), or the like is disposed on the gate conductors 121 and 124. In an exemplary embodiment, the gate insulating layer 140 may have a multilayered structure including at least two insulating layers having different physical properties.

In an exemplary embodiment, a semiconductor layer 154 including amorphous silicon, polysilicon, or the like is disposed on the gate insulating layer 140. In an exemplary embodiment, the semiconductor layer 154 may include an oxide semiconductor.

Ohmic contacts 163 and 165 are disposed on the semiconductor layer 154. In an exemplary embodiment, the ohmic contacts 163 and 165 may include a material such as n+ hydrogenated amorphous silicon in which an n-type impurity such as phosphorus is doped at a high concentration, or a silicide. The ohmic contacts 163 and 165 may form a pair to be disposed on the semiconductor layer 154. In the case where the semiconductor 154 is the oxide semiconductor, the ohmic contacts 163 and 165 may be omitted.

A data conductor including a data line 171 including a source electrode 173 and a drain electrode 175 is disposed on the ohmic contacts 163 and 165 and the gate insulating layer 140.

The data line 171 includes a wide end portion (not shown) for connection with another layer or an external driving circuit. The data line 171 transmits a data signal and mainly extends in a vertical direction to cross the gate line 121.

In an exemplary embodiment, the data line 171 may have a first curved portion having a curved shape to obtain maximum transmittance of the LCD, and curved portions meet each other at the center region of the pixel area thereby forming a "V" shape. The center region of the pixel area may further include a second curved portion inclined by the first curved portion at a predetermined angle.

In an exemplary embodiment, the first bent portion of the data line 171 may be bent so as to form an angle of about 7° with a vertical reference line y forming an angle of 90° in an extension direction of the gate line 121. In an exemplary embodiment, the second bent portion disposed in the middle region of the pixel region may be further bent so as to form an angle of about 7° to about 15° with the first bent portion.

The source electrode 173 is a portion of the data line 171, and is disposed on the same line as the data line 171. The drain electrode 175 is provided so as to extend in parallel to the source electrode 173. Accordingly, the drain electrode 175 is parallel to a portion of the data line 171.

The gate electrode 124, the source electrode 173, and the drain electrode 175 form a thin film transistor ("TFT") as a switching element along with the semiconductor 154, and a channel of the TFT is provided at an exposed portion of the semiconductor 154 between the source electrode 173 and the drain electrode 175.

The LCD according to the exemplary embodiment of the invention may include the source electrode 173 disposed on the same line as the data line 171 and the drain electrode 175 extending in parallel to the data line 171 to increase a width of the TFT while the area of the data conductor is not increased, thus increasing an opening ratio of the LCD.

A first passivation layer 180n is disposed on the data conductors 171, 173, and 175, the gate insulating layer 140, and the exposed portion of the semiconductor 154. In an exemplary embodiment, the first passivation layer 180n may include an organic insulating material, an inorganic insulating material, or the like.

A second passivation layer 180q is disposed on the first passivation layer 180n. In another exemplary embodiment, the second passivation layer 180q may be omitted. In an exemplary embodiment, the second passivation layer 180q may include the organic material.

A common electrode 270 is disposed on the second passivation layer 180q.

In an exemplary embodiment, the common electrode 270 may have a surface shape and be disposed on the entire surface of the substrate 110 to have an overall plate shape, and an opening 138 may be defined in the common electrode 270 in a region corresponding to the circumference of the drain electrode 175. That is, the common electrode 270 may have a flat plate shape.

Common electrodes 270 disposed in adjacent pixels may be connected to each other to receive a common voltage having a predetermined magnitude supplied from outside of the display region.

A third passivation layer 180z is provided on the common electrode 270. In an exemplary embodiment, the third passivation layer 180z may include an organic insulating material or an inorganic insulating material.

A pixel electrode 191 is provided on the third passivation layer 180z. The pixel electrode 191 includes a curved edge which is substantially parallel to the first curved portion and the second curved portion of the data line 171. A plurality of first cutouts 92 may be defined in the pixel electrode 191, and the pixel electrode 191 includes a plurality of first branch electrodes 192 defined by the plurality of first cutouts 92.

A contact hole 185 is defined in the first passivation layer 180n, the second passivation layer 180q, and the third passivation layer 180z to expose the drain electrode 175. The pixel electrode 191 is physically and electrically connected to the drain electrode 175 through the contact hole 185 so as to be applied with the voltage from the drain electrode 175.

A first alignment layer 11 is coated on the pixel electrode 191 and the third passivation layer 180z. In an exemplary embodiment, the first alignment layer 11 may be a horizontal alignment layer and may be rubbed in a predetermined direction. However, in the LCD according to another exemplary embodiment of the invention, the first alignment layer may include a photoreactive material to be photo-aligned.

Now, the second display panel 200 will be described.

A light blocking member 220 is disposed on a second substrate 210 including transparent glass, plastic, or the like. The light blocking member 220 is also referred to as a black matrix, and blocks light leakage.

A plurality of color filters 230 is disposed on the second substrate 210. Each color filter 230 may uniquely display one of the primary colors, and an example of the primary colors includes three primary colors such as red, green, and blue, or yellow, cyan, and magenta. Although it is not illustrated, the color filter may further include a color filter displaying a combination color of the primary colors, or white, other than the primary colors.

An overcoat 250 is disposed on the color filter 230 and the light blocking member 220. In an exemplary embodiment, the overcoat 250 may include an (organic) insulator, and it protects the color filters 230, prevents the color filters 230 from being exposed, and provides a planarized surface. In another exemplary embodiment, the overcoat 250 may be omitted.

A second alignment layer 21 is disposed on the overcoat 250.

In an exemplary embodiment, the liquid crystal layer 3 includes a nematic liquid crystal material having positive dielectric anisotropy. Liquid crystal molecules of the liquid crystal layer 3 are arranged such that their longer axes are parallel to the display panels 100 and 200.

The pixel electrode 191 is applied with the data voltage from the drain electrode 175, and the common electrode 270 is applied with the common voltage of a predetermined level from a common voltage application unit disposed outside the display area.

The pixel electrode 191 and the common electrode 270 as field generating electrodes generate an electric field such that the liquid crystal molecules of the liquid crystal layer 3 disposed thereon are rotated in a direction parallel to the direction of the electric field. As described above, according to the determined rotation direction of the liquid crystal molecules, the polarization of light passing through the liquid crystal layer is changed.

Resistivity of the first alignment layer 11 is smaller than resistivity of the second alignment layer 21. In an exemplary embodiment, the ratio of the resistivity of the second alignment layer 21 to the resistivity of the first alignment layer 11 is about 10 to about 100, for example.

The first thickness D1 of the first alignment layer 11 is smaller than the second thickness D2 of the second alignment layer 21. In an exemplary embodiment, a ratio (D2/D1) of the second thickness D2 of the second alignment layer 21 to the first thickness D1 of the first alignment layer 11 is about 0.3 to about 0.7, for example.

In an exemplary embodiment, the resistivity value of the second alignment layer 21 may be larger than about 10E14, and the resistivity value of the first alignment layer 11 may be smaller than about 10E13, for example. The resistivity value of the second alignment layer 21 may be larger than about 10E16, and the resistivity value of the first alignment layer 11 may be smaller than about 10E14. In an exemplary embodiment, the second alignment layer 21 may include the inorganic material.

As described above, for the LCD according to an exemplary embodiment of the invention, by controlling the resistivity value and the thickness of the first alignment layer 11 provided at the first display panel 100 and the second alignment layer 21 provided in the second display panel 200, the charged charge C in the first display panel 100 including two field generating electrodes may be easily discharged, and flowing in of the unnecessary charge that may be generated from the impurity in the second display panel 200 may be reduced or effectively prevented. Accordingly, application of the unnecessary electric field by the charged charge to the liquid crystal layer may be reduced or effectively prevented, thereby preventing the afterimage due to the unnecessary electric field.

Figure 4:
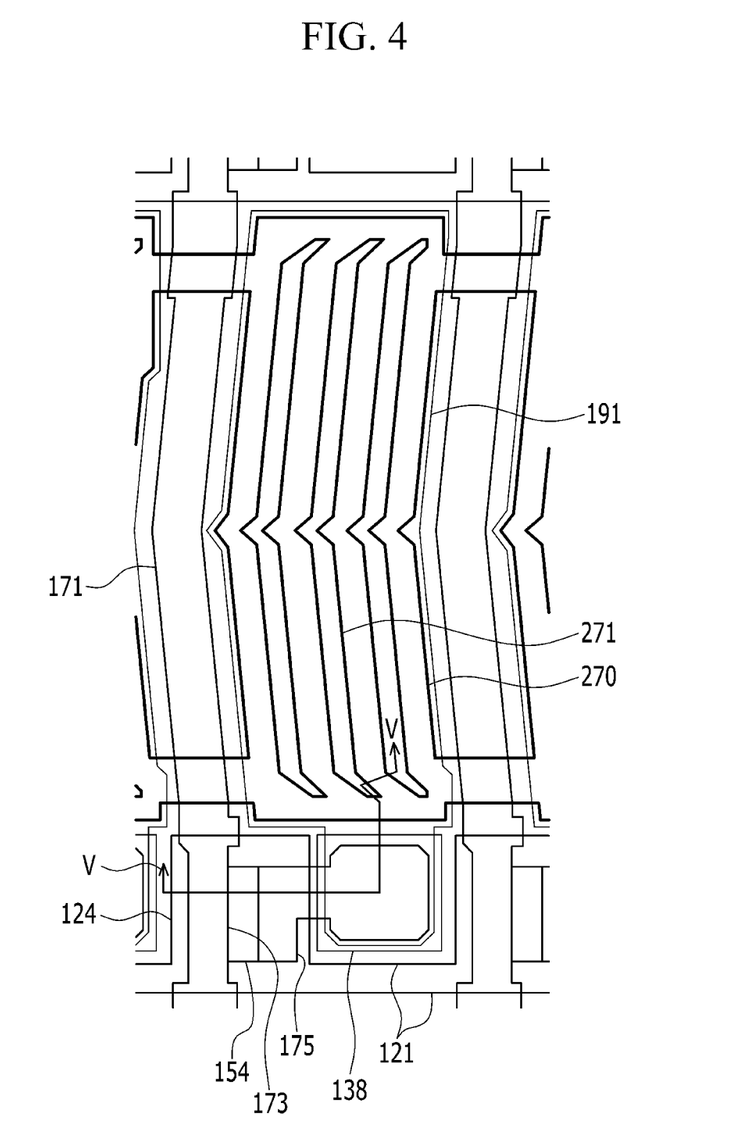
FIG. 4 is a plan view of another exemplary embodiment of an LCD according to the invention.

Next, the LCD according to another exemplary embodiment of the invention will be described with reference to FIGS. 4 and 5. FIG. 4 is a plan view of an LCD according to an exemplary embodiment of the invention, and FIG. 5 is a cross-sectional view of the LCD of FIG. 4 take along line V-V.

Figure 5:
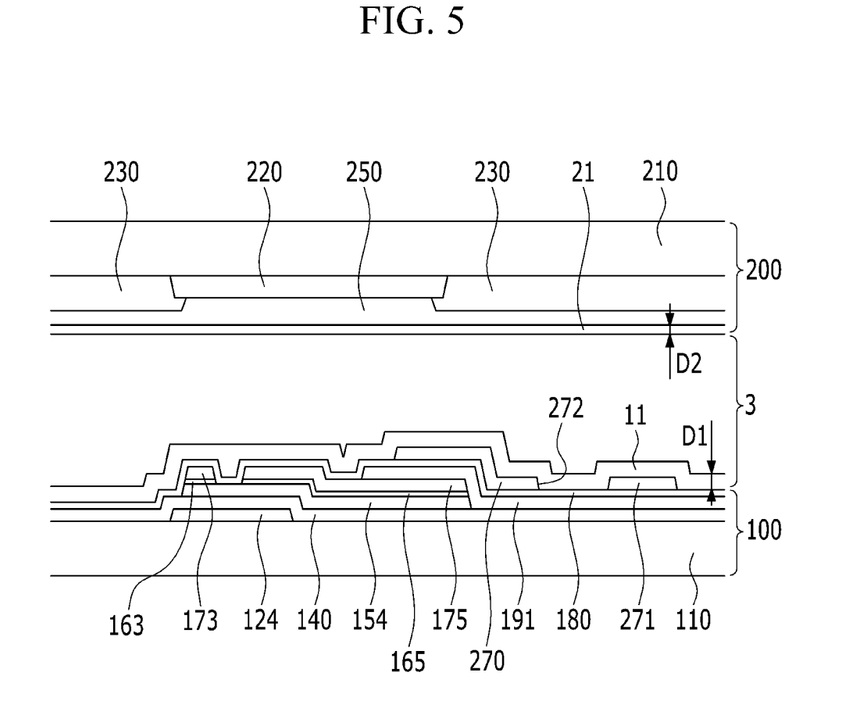
FIG. 5 is a cross-sectional view of the LCD of FIG. 4 take along line V-V.

Referring to FIGS. 4 and 5, the LCD according to the exemplary embodiment is similar to the LCD according to the exemplary embodiment shown in FIGS. 2 and 3. Detailed descriptions of like constituent elements are omitted.

Referring to FIGS. 4 and 5, the LCD according to the exemplary embodiment includes the first display panel 100 and the second display panel 200 opposite to each other, and the liquid crystal layer 3 injected between the display panels.

Firstly, the first display panel 100 will be described.

The gate conductor including the gate line 121 is disposed on the first substrate 110.

In an exemplary embodiment, the gate insulating layer 140 including the silicon nitride (SiNx), the silicon oxide (SiOx), or the like is disposed on the gate conductor 121.

The semiconductor 154 is disposed on the gate insulating layer 140.

The ohmic contacts 163 and 165 are disposed on the semiconductor 154. When the semiconductor 154 is the oxide semiconductor, the ohmic contacts 163 and 165 may be omitted.

The data conductor including the data line 171 including the source electrode 173 and the drain electrode 175 is disposed on the ohmic contacts 163 and 165 and the gate insulating layer 140.

The pixel electrode 191 is disposed directly on the drain electrode 175. The pixel electrode 191 is disposed in one pixel area while having the flat shape, that is, the plate shape.

A passivation layer 180 is disposed on the data conductors 171, 173, and 175, the gate insulating layer 140, the exposed portion of the semiconductor 154, and the pixel electrode 191. However, in the LCD according to another exemplary embodiment of the invention, the passivation layer 180 may be disposed between the pixel electrode 191 and the data line 171, and the pixel electrode 191 may be connected to the drain electrode 175 through the contact hole (not shown) provided at the passivation layer 180.

The common electrode 270 is disposed on the passivation layer 180. Adjacent common electrodes 270 are connected to each other and receive the reference voltage from the common voltage application unit disposed outside the display area.

The common electrode 270 includes the curved edge which is substantially parallel to the first curved portion and the second curved portion of the data line 171, and the common electrodes 270 disposed at the adjacent pixels are connected to each other. A plurality of second cutouts 272 is defined in the common electrode 270 includes, and the common electrode 270 includes a plurality of second branch electrodes 271 defined by the plurality of second cutouts 272.

The first alignment layer 11 is coated on the common electrode 270 and the passivation layer 180, and although not shown, the first alignment layer 11 may be the horizontal alignment layer and may be rubbed in a predetermined direction. However, in the LCD according to another exemplary embodiment of the invention, the first alignment 11 layer may include a photoreactive material to be photoaligned.

Now, the second display panel 200 will be described.

The light blocking member 220 is disposed on the second substrate 210. A plurality of color filters 230 is disposed on the second substrate 210.

The overcoat 250 is disposed on the color filter 230 and the light blocking member 220. In another exemplary embodiment, the overcoat 250 may be omitted.

The second alignment layer 21 may be disposed on the overcoat 250. In an exemplary embodiment, the liquid crystal layer 3 includes a nematic liquid crystal material having positive dielectric anisotropy. Liquid crystal molecules of the liquid crystal layer 3 are arranged such that their longer axes are parallel to the display panels 100 and 200.

The pixel electrode 191 is applied with the data voltage from the drain electrode 175, and the common electrode 270 is applied with the common voltage of the predetermined level from the common voltage application unit disposed outside the display area.

The pixel electrode 191 and the common electrode 270 as field generating electrodes generate an electrical field such that the liquid crystal molecules of the liquid crystal layer 3 disposed thereon are rotated in a direction parallel to the direction of the electric field. As described above, according to the determined rotation direction of the liquid crystal molecules, the polarization of light passing through the liquid crystal layer is changed.

The resistivity of the first alignment layer 11 is smaller than the resistivity of the second alignment layer 21. In an exemplary embodiment, the ratio of the resistivity of the second alignment layer 21 to the resistivity of the first alignment layer 11 is about 10 to about 100, for example.

The first thickness D1 of the first alignment layer 11 is smaller than the second thickness D2 of the second alignment layer 21. In an exemplary embodiment, a ratio (D2/D1) of the second thickness D2 of the second alignment layer 21 to the first thickness D1 of the first alignment layer 11 is about 0.3 to about 0.7, for example.

In an exemplary embodiment, the resistivity value of the second alignment layer 21 may be larger than about 10E14, and the resistivity value of the first alignment layer 11 may be smaller than about 10E13, for example. In an exemplary embodiment, the resistivity value of the second alignment layer 21 may be larger than about 10E16, and the resistivity value of the first alignment layer 11 may be smaller than about 10E14, for example. The second alignment layer 21 may include the inorganic material.

As described above, for the LCD according to an exemplary embodiment of the invention, by controlling the resistivity value and the thickness of the first alignment layer 11 provided at the first display panel 100 and the second alignment layer 21 provided in the second display panel 200, the charged charge C in the first display panel 100 including two field generating electrodes may be easily discharged, and flowing in of the unnecessary charge that may be generated from the impurity in the second display panel 200 may be reduced or effectively prevented. Accordingly, application of the unnecessary electric field by the charged charge to the liquid crystal layer may be reduced or effectively prevented, thereby preventing the afterimage due to the unnecessary electric field.

Next, an experimental example according to the invention will be described with reference to Table 1. In the experimental example, in a conventional LCD, in a first case in which two field generating electrodes are disposed on the first substrate, the first alignment layer and the second alignment layer are disposed on the first substrate and the second substrate, the resistivity value of the first alignment layer and the second alignment layer is about 410E13, and the thickness thereof is provided at about 1000 angstroms (Å), in the LCD according to an exemplary embodiment of the invention, in a second case in which two field generating electrodes are disposed on the first substrate, the resistivity value of the first alignment layer disposed on the first substrate and the second alignment layer disposed on the second substrate is about 410E13, the thickness of the first alignment layer is about 1000 Å, and the thickness of the second alignment layer is about 200 Å, and in a third case in which two field generating electrodes are disposed on the first substrate, the resistivity value of the first alignment layer disposed on the first substrate is about 410E13, the thickness of the first alignment layer is about 1000 Å, the resistivity value of the second alignment layer disposed on the second substrate is about 610E14, and the thickness of the second alignment layer is about 500 Å, and after two field generating electrodes are applied with the same voltage and are driven for one hour at a temperature of 60 degrees Celsius (° C.), an afterimage result is measured after the passage of 10 minutes and the result is shown in Table 1. Except for the resistivity value and the thickness of the first alignment layer and the second alignment layer, the rest of the conditions are all the same.

TABLE 1

| | Case | | |
|---|---|---|---|
| | First case | Second case | Third case |
| Afterimage | 4 degrees | 2 degrees | 1 degree |

Here, the 4 degrees as degrees of the afterimage is a degree to which a luminance difference is recognized for each position at a front side and a lateral side, the 2 degrees as degrees of the afterimage is a degree to which the luminance difference is somehow recognized for each position in the front side, and the 1 degree as a degree of the afterimage is a degree to which the luminance difference is not recognized for each position in the front side.

Referring to Table 1, like the LCD according to an exemplary embodiment of the invention, two field generating electrodes are disposed on the first substrate, and the resistivity value and the thickness of the first alignment layer disposed on the first substrate and the second alignment layer disposed on the second substrate are controlled, thereby preventing the afterimage compared with a case that the resistivity value and the thickness of the first alignment layer are the same as those of the second alignment layer.

As described above, for the LCD according to an exemplary embodiment of the invention, by controlling the resistivity value and the thickness of the first alignment layer 11 provided at the first display panel 100 and the second alignment layer 21 provided in the second display panel 200, the charged charge C in the first display panel 100 including two field generating electrodes may be easily discharged, and flowing in of the unnecessary charge that may be generated from the impurity in the second display panel 200 may be reduced or effectively prevented. Accordingly, application of the unnecessary electric field by the charged charge to the liquid crystal layer may be reduced or effectively prevented, thereby preventing the afterimage due to the unnecessary electric field.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a first electrode disposed on the first substrate;
a second electrode which is disposed on the first substrate and overlaps the first electrode;
an insulating layer interposed between the first electrode and the second electrode;
a first alignment layer disposed on the first electrode and the second electrode;
a second substrate facing the first substrate;
a liquid crystal layer disposed between the first substrate and the second substrate; and
a second alignment layer disposed between the liquid crystal layer and the second substrate,
wherein a first resistivity value of the first alignment layer is smaller than a second resistivity value of the second alignment layer, and
a first thickness of the first alignment layer is larger than a second thickness of the second alignment layer.

2. The liquid crystal display of claim 1, wherein
a ratio of the second resistivity value of the second alignment layer to the first resistivity value of the first alignment layer is about 10 to about 100.

3. The liquid crystal display of claim 1, wherein
a ratio of the second thickness of the second alignment layer to the first thickness of the first alignment layer is about 0.3 to about 0.7.

4. The liquid crystal display of claim 3, wherein
a plurality of cutouts is defined in one of the first electrode and the second electrode.

5. The liquid crystal display of claim 4, further comprising
a color filter disposed between the second substrate and the second alignment layer.

6. The liquid crystal display of claim 1, wherein
a plurality of cutouts is defined in one of the first electrode and the second electrode.

7. The liquid crystal display of claim 6, further comprising
a color filter disposed between the second substrate and the second alignment layer.

* * * * *